United States Patent
Swaminathan et al.

(10) Patent No.: US 9,137,587 B2
(45) Date of Patent: Sep. 15, 2015

(54) SYSTEM EVENT ASSISTED LIVE KEYBOARD, VIDEO AND MOUSE (KVM) CAPTURE

(71) Applicant: AMERICAN MEGATRENDS, INC., Norcross, GA (US)

(72) Inventors: Viswanathan Swaminathan, Atlanta, GA (US); Sanjay Ahuja, Snellville, GA (US); Othiyappan Kanniappan, Chennai (IN)

( * ) Notice: Subject to any disclaimer, the term of this patent is extended or adjusted under 35 U.S.C. 154(b) by 281 days.

(21) Appl. No.: 13/966,479

(22) Filed: Aug. 14, 2013

(65) Prior Publication Data

US 2015/0050004 A1  Feb. 19, 2015

(51) Int. Cl.
*H04N 21/854* (2011.01)
*G06F 9/455* (2006.01)

(52) U.S. Cl.
CPC .... *H04N 21/854* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2006/0112297 A1* | 5/2006 | Davidson | 714/2 |
| 2008/0002894 A1* | 1/2008 | Hayon et al. | 382/232 |
| 2008/0273113 A1* | 11/2008 | Hayon et al. | 348/446 |
| 2008/0282117 A1* | 11/2008 | Partani et al. | 714/48 |
| 2014/0122852 A1* | 5/2014 | Guo et al. | 713/1 |

* cited by examiner

*Primary Examiner* — Maurice L McDowell, Jr.
(74) *Attorney, Agent, or Firm* — Locke Lord LLP; Tim Tingkang Xia, Esq.

(57) ABSTRACT

The disclosure relates to system event assisted live video capture. A baseboard management controller (BMC) allocates, in its available memory space of the memory, a first video block and a first node having a video block pointer and a next node pointer, and assigns the video block pointer of the first node to indicate the first video block. The BMC captures video frames of the host computer, and stores frame data and a timestamp generated from each frame in the first video block. When the first video block is full, the BMC allocates a second video block and a second node, and assigns the next node pointer of the first block to indicate the second node, and the video block pointer of the second node to indicate the second video block. The BMC then stores the frame data and the timestamp in the second video block.

26 Claims, 9 Drawing Sheets

FIG. 3

SYSTEM EVENT ASSISTED LIVE KEYBOARD, VIDEO AND MOUSE (KVM) CAPTURE

FIELD

The present disclosure relates generally to keyboard, video and mouse (KVM) redirection in client-server computer systems, and particularly to system event assisted live KVM capture utilizing web-based languages for communication between a host computer and a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A client-server system is widely used in the business computing field. Generally, the client-server system includes a server, a client machine and a network communicating the server and the client machines. The server is a host machine running one or more server programs. The client machine does not share any of the resources of the server programs from the server, but requests contents or service function generated by the server programs from the server. When the client machine initiates a communication session with the server by sending a request of certain contents, the corresponding server program generates the contents, compresses the contents, and sends the compressed contents to the client machine. The client machine then decompresses the compressed contents for its use, e.g. displaying the contents on a screen of the client machine.

In recent years, mobile technology is rapidly developed, and various mobile phones and tablets have been produced using different operating systems (OS's) and programs. In a client-server system with these different mobile devices are provided as client machines, communication between the server and the client machines become difficult due to the co-existence of the different client machines. Specifically, the compressed contents provided by the server for one client machine may not be decompressable by another client machine because the two client machines may use different OS and/or displaying programs. KVM redirection system provides a solution for such communication difficulties. Specifically, a baseboard management controller (BMC) can be installed in the host computer to provide monitoring functions of the KVM signals, and a user may initiate a KVM redirection session from a remote mobile device to directly control the KVM functions of the host computer remotely through the BMC. For example, when a system event (such as an error) occurs on the host computer, the user may identify the event using the KVM redirection to remotely monitor the video signals displayed on the screen of the host computer as snapshots from the mobile device. However, monitoring the snapshots merely allows the user to see the system event, but does not help the user to figure out the cause of the event. For example, the user may see from the snapshots that an error has occurred at the host computer, but the action that causes the error to occur is unknown to the user.

Therefore, an unaddressed need exists in the art to address the aforementioned deficiencies and inadequacies.

SUMMARY

In one aspect of the disclosure, a method of performing video capture at a host computer is disclosed. The method includes: obtaining, by a baseboard management controller (BMC) of the host computer, information of a predetermined block size, wherein the BMC comprises a memory having available memory space; allocating, at the BMC, in the available memory space of the memory a first video block having the predetermined block size and a first node having a node structure, wherein the node structure comprises a video block pointer and a next node pointer; assigning a start value to a global pointer and a first value to the video block pointer of the first node, wherein the start value indicates a memory address of the first node, and the first value indicates a memory address of the first video block, wherein the first node is a start node and the first video block is a start video block; capturing, at the BMC, video frames of the host computer, and processing each frame of the video frames to generate frame data and a timestamp corresponding to the each frame; storing the frame data and the timestamp in the first video block; in response to the first video block being full, allocating, at the BMC, in the available memory space of the memory a second video block having the predetermined block size and a second node having the node structure; assigning a node value to the next node pointer of the first block and a second value to the video block pointer of the second node, wherein the node value indicates a memory address of the second node, and the second value indicates a memory address of the second video block; and storing the frame data and the timestamp in the second video block.

In certain embodiments, the method further includes: in response to a current video block being full, allocating, at the BMC, in the available memory space of the memory a next video block having the predetermined block size and a next node having the node structure; assigning a next node value to the next node pointer of the current video block and a third value to the video block pointer of the next node, wherein the next node value indicates a memory address of the next node, and the third value indicates a memory address of the next video block; and storing the frame data and the timestamp in the next video block.

In certain embodiments, the method further includes: in response to the memory being full, replacing the start value of the global pointer by a value stored in the next node pointer of the start node, and freeing the available memory space occupied by the start node and the start video block. In certain embodiments, the replacing of the start value of the global pointer includes: assigning the value stored in the next node pointer of the start node to a temporary pointer; freeing the available memory space occupied by the start node and the start video block; and replacing the start value of the global pointer by the value of the temporary pointer, such that the node indicated by the replaced start value of the global pointer is configured as a new start node, and the video block indicated by the video block pointer of the new start node is configured as a new start video block.

In certain embodiments, the method further includes: in response to a system event occurring in the host computer, redirecting, at a KVM redirection module of the BMC, the frame data and the timestamp stored in the video blocks of the memory to a computing device such that the computing device displays the frame data according to the timestamp on a display device of the computing device.

In certain embodiments, the capturing step includes: capturing, by the BMC, a current frame of the video frames; when the current frame is a reference frame, generating a full screen frame data of the reference frame as the frame data, and generating time information corresponding to the reference frame as the timestamp; and when the current frame is a non-reference frame, comparing the current frame with a previous frame, and if the current frame changes from the previous frame, generating a delta frame as the frame data of the current frame, and generating time information corresponding to the current frame as the timestamp, wherein the delta frame comprises at least one patch of the current frame different from the previous frame. In certain embodiments, the method further includes: skipping the current frame when the current frame is a blank frame. In certain embodiments, the comparing of the current frame and the previous frame includes: dividing the current frame and the previous frame into a plurality of tiles in a matrix form; comparing each tile of the current frame to the corresponding tile of the previous frame; and if at least one tile of the current frame changes from the previous frame, generating the at least one patch of the delta frame from the at least one changed tile.

In certain embodiments, the method further includes: retrieving, at the BMC, a configuration file from a non-volatile memory, wherein the configuration file stores the information of the predetermined block size and the node structure. In certain embodiments, the configuration file further stores information of size of the available memory space of the memory of the BMC.

Another aspect of the present disclosure relates to a system for live video capture. The system includes a host computer, and a baseboard management controller (BMC) connected to the host computer. The BMC includes a memory having available memory space and a non-volatile memory storing a firmware. The firmware is configured, when executed, to: obtain information of a predetermined block size; allocate, in the available memory space of the memory a first video block having the predetermined block size and a first node having a node structure, wherein the node structure comprises a video block pointer and a next node pointer; assign a start value to a global pointer and a first value to the video block pointer of the first node, wherein the start value indicates a memory address of the first node, and the first value indicates a memory address of the first video block, wherein the first node is a start node and the first video block is a start video block; capture video frames of the host computer, and process each frame of the video frames to generate frame data and a timestamp corresponding to the each frame; store the frame data and the timestamp in the first video block; in response to the first video block being full, allocate in the available memory space of the memory a second video block having the predetermined block size and a second node having the node structure; assign a node value to the next node pointer of the first block and a second value to the video block pointer of the second node, wherein the node value indicates a memory address of the second node, and the second value indicates a memory address of the second video block; and store the frame data and the timestamp in the second video block.

In certain embodiments, the firmware is further configured, when executed, to: in response to a current video block being full, allocate, at the BMC, in the available memory space of the memory a next video block having the predetermined block size and a next node having the node structure; assign a next node value to the next node pointer of the current video block and a third value to the video block pointer of the next node, wherein the next node value indicates a memory address of the next node, and the third value indicates a memory address of the next video block; and store the frame data and the timestamp in the next video block.

In certain embodiments, the firmware is further configured, when executed, to: in response to the memory being full, replace the start value of the global pointer by a value stored in the next node pointer of the start node, and free the available memory space occupied by the start node and the start video block.

In certain embodiments, the firmware is configured to replace the start value of the global pointer by: assigning the value stored in the next node pointer of the start node to a temporary pointer; freeing the available memory space occupied by the start node and the start video block; and replacing the start value of the global pointer by the value of the temporary pointer, such that the node indicated by the replaced start value of the global pointer is configured as a new start node, and the video block indicated by the video block pointer of the new start node is configured as a new start video block.

In certain embodiments, the firmware is further configured, when executed, to: in response to a system event occurring in the host computer, redirect, at a KVM redirection module of the BMC, the frame data and the timestamp stored in the video blocks of the memory to a computing device such that the computing device displays the frame data according to the timestamp on a display device of the computing device.

In certain embodiments, the firmware is configured to capture the video frames of the host computer and to process each frame of the video frames by: capturing a current frame of the video frames; when the current frame is a reference frame, generating a full screen frame data of the reference frame as the frame data, and generating time information corresponding to the reference frame as the timestamp; when the current frame is a non-reference frame, comparing the current frame with a previous frame, and if the current frame changes from the previous frame, generating a delta frame as the frame data of the current frame, and generating time information corresponding to the current frame as the timestamp, wherein the delta frame comprises at least one patch of the current frame different from the previous frame; and skipping the current frame when the current frame is a blank frame.

In certain embodiments, the firmware is configured to compare the current frame and the previous frame by: dividing the current frame and the previous frame into a plurality of tiles in a matrix form; comparing each tile of the current frame to the corresponding tile of the previous frame; and if at least one tile of the current frame changes from the previous frame, generating the at least one patch of the delta frame from the at least one changed tile.

In certain embodiments, the firmware is further configured, when executed, to retrieve a configuration file from a non-volatile memory, wherein the configuration file stores the information of the predetermined block size, the node structure, and information of size of the available memory space of the memory of the BMC.

In a further aspect of the present disclosure, a BMC for live video capture of a host computer is provided. The BMC includes a memory having available memory space; and a non-volatile memory storing a firmware. The firmware is configured, when executed, to: obtain information of a predetermined block size; allocate, in the available memory space of the memory a first video block having the predetermined block size and a first node having a node structure, wherein the node structure comprises a video block pointer and a next node pointer; assign a start value to a global pointer and a first value to the video block pointer of the first node, wherein the start value indicates a memory address of the first node, and the first value indicates a memory address of the first video block, wherein the first node is a start node and the first video block is a start video block; capture video frames of the host computer, and process each frame of the video frames to generate frame data and a timestamp corresponding to the each frame; store the frame data and the timestamp in the first video block; in response to the first video block being full, allocate in the available memory space of the memory a second video block having the predetermined block size and a second node having the node structure; assign a node value to the next node pointer of the first block and a second value to the video block pointer of the second node, wherein the node value indicates a memory address of the second node, and the second value indicates a memory address of the second video block; and store the frame data and the timestamp in the second video block.

In certain embodiments, the firmware is further configured, when executed, to: in response to a current video block being full, allocate, at the BMC, in the available memory space of the memory a next video block having the predetermined block size and a next node having the node structure; assign a next node value to the next node pointer of the current video block and a third value to the video block pointer of the next node, wherein the next node value indicates a memory address of the next node, and the third value indicates a memory address of the next video block; and store the frame data and the timestamp in the next video block.

In certain embodiments, the firmware is further configured, when executed, to: in response to the memory being full, replace the start value of the global pointer by a value stored in the next node pointer of the start node, and free the available memory space occupied by the start node and the start video block.

In certain embodiments, the firmware is configured to replace the start value of the global pointer by: assigning the value stored in the next node pointer of the start node to a temporary pointer; freeing the available memory space occupied by the start node and the start video block; and replacing the start value of the global pointer by the value of the temporary pointer, such that the node indicated by the replaced start value of the global pointer is configured as a new start node, and the video block indicated by the video block pointer of the new start node is configured as a new start video block.

In certain embodiments, the firmware is further configured, when executed, to: in response to a system event occurring in the host computer, redirect, at a KVM redirection module of the BMC, the frame data and the timestamp stored in the video blocks of the memory to a computing device such that the computing device displays the frame data according to the timestamp on a display device of the computing device.

In certain embodiments, the firmware is configured to capture the video frames of the host computer and to process each frame of the video frames by: capturing a current frame of the video frames; when the current frame is a reference frame, generating a full screen frame data of the reference frame as the frame data, and generating time information corresponding to the reference frame as the timestamp; when the current frame is a non-reference frame, comparing the current frame with a previous frame, and if the current frame changes from the previous frame, generating a delta frame as the frame data of the current frame, and generating time information corresponding to the current frame as the timestamp, wherein the delta frame comprises at least one patch of the current frame different from the previous frame; and skipping the current frame when the current frame is a blank frame.

In certain embodiments, the firmware is configured to compare the current frame and the previous frame by: dividing the current frame and the previous frame into a plurality of tiles in a matrix form; comparing each tile of the current frame to the corresponding tile of the previous frame; and if at least one tile of the current frame changes from the previous frame, generating the at least one patch of the delta frame from the at least one changed tile.

In certain embodiments, the firmware is further configured, when executed, to retrieve a configuration file from a non-volatile memory, wherein the configuration file stores the information of the predetermined block size, the node structure, and information of size of the available memory space of the memory of the BMC.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein:

FIG. 3 schematically depicts tile-to-tile comparison of frames to generate patches according to certain embodiments of the present disclosure;

DETAILED DESCRIPTION

Figure 1:
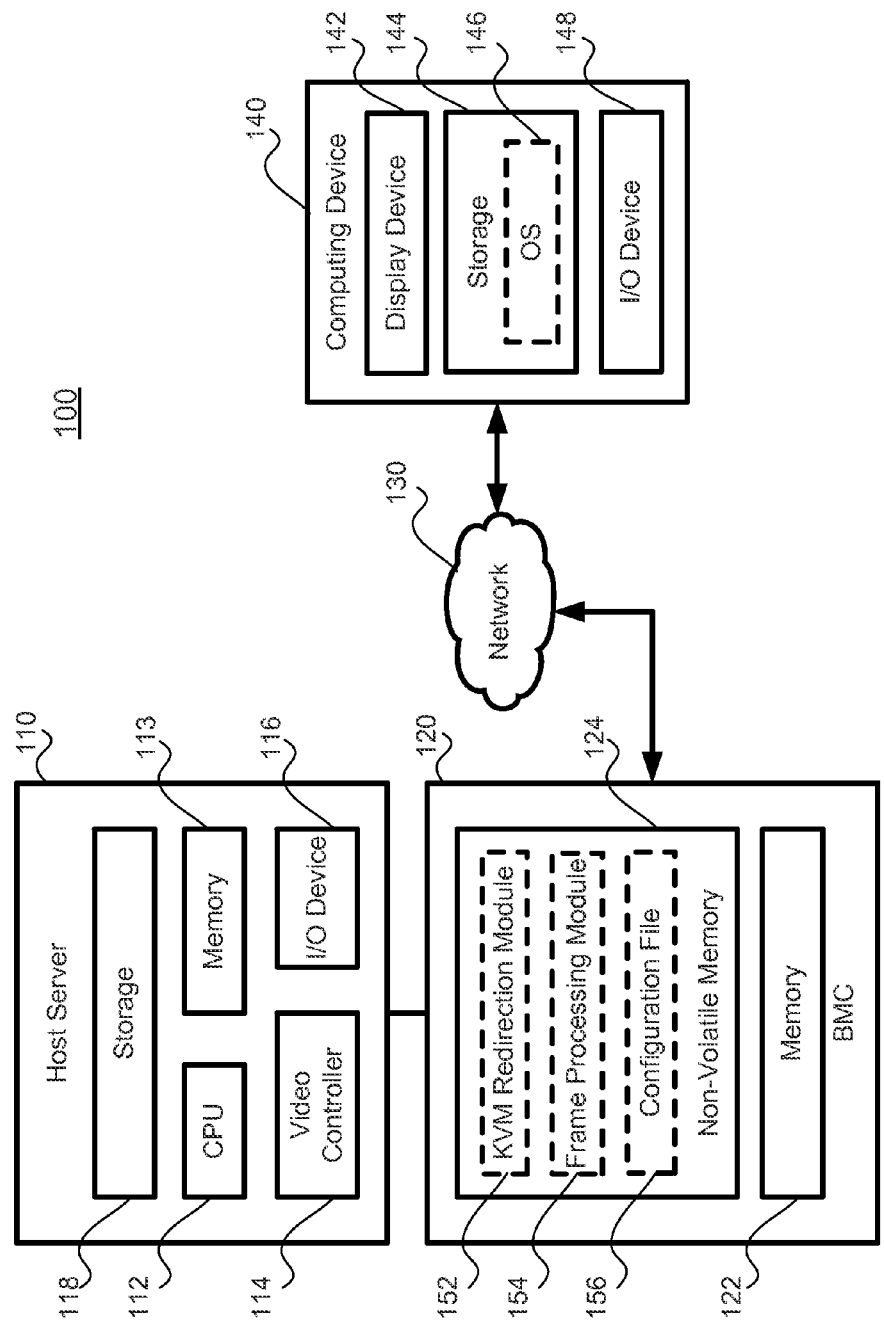
FIG. 1 schematically depicts a client-server KVM redirection system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks.

The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 schematically depicts a client-server KVM redirection system according to certain embodiments of the present disclosure. As shown in FIG. 1, the system 100 includes a host computer 110 having a baseboard management controller (BMC) 120, and a computing device 140 connected to the BMC 120 of the host computer 110 via a network 130. The system 100 can be a system that incorporates more than one interconnected system, such as a client-server network. The network 130 may be a wired or wireless network, and may be of various forms such as a local area network (LAN) or wide area network (WAN) including the Internet.

The computing device 140 can be a local mobile device serving as the client device of the system 100, which is subject to receive actions from the user. As shown in FIG. 1, the computing device 140 is remotely connected to the BMC 120 of the host computer 110 via the network 130. One of ordinary skill in the art would appreciate that the system 100 may include a plurality of computing devices 140 simultaneously remotely connected to the host computer 110.

As shown in FIG. 1, the computing device 140 includes a display device 142, a storage 144 storing an OS 146, and at least one I/O device 148. Further, although not explicitly shown in FIG. 1, the computing device 140 may also have a baseboard with a CPU and a memory embedded thereon such that the computing device 140 is operable independently without being connected to the BMC 120 of the host computer 110. Examples of the computing device 140 may include, for example, portable devices such as smartphones, tablets or other mobile computer devices.

The display device 142 is configured to display video signals generated or received by the computing device 140. In certain embodiments, when a user sends an instruction from the computing device 140 to the BMC 120 for redirecting KVM signals of the host computer 110, the KVM redirection module 152 of the BMC 120 redirects the frame data stored in the memory 122 of the BMC 120 corresponding to the video signals of the host computer 110 to the computing device 140 such that the display device 142 may display the frame data.

For example, when the user suspects that a system event (such as an error) occurs in the host computer 110, the user may send an instruction from the computing device 140 to the BMC 120 for redirecting KVM signals of the host computer 110. Upon receiving the frame data and the timestamp redirected by the KVM redirection module 152 of the BMC 120, the computing device 140 may then display the frame data according to the timestamp on the display device 142.

The storage 144 is a data storage media for storing the OS 146 and other applications of the computing device 140. The I/O device 148 generates and controls the I/O signals of the computing device 140. Examples of the storage 144 of the computing device 140 may include flash memory, memory cards, USB drives, hard drives, floppy disks, optical drive, or any other types of data storage devices. Examples of the I/O device 148 include keyboards, touch pads, mouse, microphones, display screens, touch screens, or other I/O devices applicable for the computing device 140. Some I/O devices, such as touch screens, are provided for the dual input/output purposes for the computing device 140.

The host computer 110 may be a general purpose computer system or a headless computer system. As shown in FIG. 1, the host computer 110 includes a baseboard or the "motherboard" (not shown), a storage 116, and at least one I/O device 118.

The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the host computer 110 include, but not limited to, a central processing unit (CPU) 112, a memory 113, a video controller 114, and other required memory and Input/Output (I/O) modules (not shown). The BMC 120 may also be a component on the baseboard. In certain embodiments, the CPU 112, the memory 113, the video controller 114 and the BMC 120 may be embedded on the baseboard, or may be connected to the baseboard through an interface. In certain embodiments, the interface may be physical hardware interface such as electrical connectors, buses, ports, cables, terminals, or other I/O devices. Further, the host computer 110 includes a storage 116, which is a data storage media for storing the OS (not shown) and other applications of the host computer 110, and at least one I/O device 116.

The CPU 112 is a host processor which is configured to control operation of the host computer 110. The host processor can execute an operating system (OS) or other applications of the host computer 110. In certain embodiments, the host computer 110 may run on or more than one CPU as the host processor, such as two CPUs, four CPUs, eight CPUs, or any suitable number of CPUs.

The memory 113 can be a volatile memory, such as the random-access memory (RAM), for storing the data and information during the operation of the host computer 110.

The video controller 114 generates the video signals for the host computer 110. In certain embodiments, the host computer 110 may have a display device for displaying the video signals, and the video controller 114 controls the displaying of the video signals on the display device. The video signals may include a plurality of frames, and each frame corresponds to a full screen image. In certain embodiments, the video controller 114 can be implemented by hardware controllers or software drivers.

The storage 116 is a data storage media for storing the OS (not shown) and other applications of the host computer 110, and the I/O device 118 generates and controls the I/O signals of the host computer 110. Examples of the storage 116 may include flash memory, memory cards, USB drives, hard drives, floppy disks, optical drives, or any other types of data storage devices. Examples of the I/O device 118 include keyboards, touch pads, mouse, microphones, display screens, touch screens, or other I/O devices applicable for the host computer 110. Some I/O devices, such as touch screens, are provided for the dual input/output purposes.

The BMC 120 refers to a specialized microcontroller that manages the interface between system management software and platform hardware. Thus, different types of sensors can be built into the host computer 110, and the BMC 120 reads these sensors to obtain parameters such as temperature, cooling fan speeds, power status, OS status, etc. The BMC 120 monitors the sensors and can send alerts to a system administrator via the network if any of the parameters do not stay within preset limits, indicating a potential failure of the host computer 110. The administrator can also remotely communicate with the BMC 120 to take some corrective action such as resetting or power cycling the host computer 110 to get a hung OS running again. Further, in the KVM redirection system 100, the BMC 120 provides a KVM redirection module, which allows configuration and management of the host computer 110 by establishing virtual KVM devices corresponding to the physical KVM devices being remotely accessible for the host computer 110. Thus, a user may initiate a KVM redirection session from the computing device 140 to directly control the KVM functions of the host computer 110 remotely through the BMC 120.

As shown in FIG. 1, the BMC 120 includes a memory 122 and a non-volatile memory 124. The memory 122 can be a volatile memory, such as the RAM, for storing the data and information during the operation of the host computer 110. A part of the memory space of the memory 122 is available for storing the data of the live KVM capture, which will be described in detail later.

The non-volatile memory 124 stores the firmware of the BMC 120. As shown in FIG. 1, the firmware of the BMC 120 includes, among other things, a KVM redirection module 152, a frame processing module 154 and a configuration file 156. In certain embodiments, the firmware may include a web connection module (not shown) for communication with the network 130.

The KVM redirection module 152 is a virtual module that emulates the KVM peripheral devices as if they were physically attached to the host computer 110. For example, when the host computer 110 may be a headless computer system without any display devices, the KVM redirection module 152 may emulate a virtual display device for the host computer 110 for receiving and virtually displaying the video signals.

The frame processing module 154 is configured to process the frames of the video signals and to generate frame data corresponding to each frame. In certain embodiments, the frame processing module 154 selects a reference frame from the frames of the video signals, and processes all subsequent frames to the reference frame with reference to the reference frame. In certain embodiments, the frame processing module 154 may skip blank frames in order to save memory space. In other words, the frame processing module 154 only processes with the non-blank frames, and the reference frame is also a non-blank frame.

Figure 2:
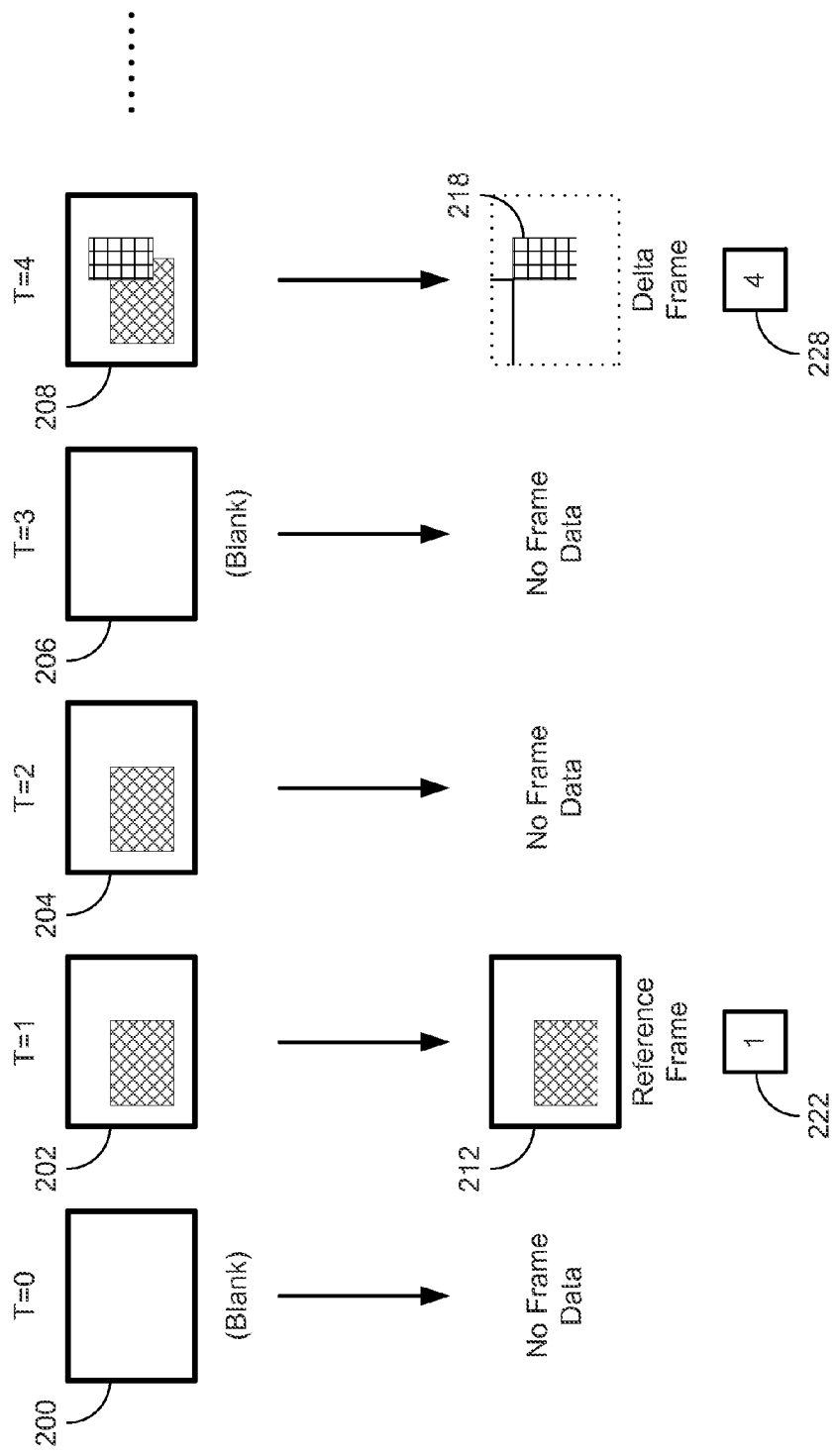
FIG. 2 schematically depicts image processing of the frames according to certain embodiments of the present disclosure.

FIG. 2 schematically depicts image processing of the frames according to certain embodiments of the present disclosure. As shown in FIG. 2 the video signal includes a plurality of consecutive frames 200, 202, 204, 206 and 208. Each frame is captured at time T, where T=0 to 4. The frames 200 and 206 (frames at T=0 and T=3) are blank frames. The frame 204 (T=2) remains unchanged from the frame 202 (T=1). In other words, the frames 202 and 204 show the same image.

When the frame processing module 154 receives the frame 200, which is a blank frame, the frame processing module 154 does not generate any corresponding frame data for the blank frame.

When the frame processing module 154 receives the frame 202, which is a non-blank frame, the frame processing module 154 designates the frame 202 as the reference frame, and generates a full screen frame data 212 of the reference frame as the frame data. The frame processing module 154 also generates the time information (time value T=1) corresponding to the frame 202 as the timestamp 222. Thus, the full screen frame data 212 and the timestamp 222 constitute the data corresponding to the reference frame 202.

When the frame processing module 154 receives the frame 204, which is a non-blank frame, the frame processing module 154 compares the frame 204 with the previous frame 202, and determines that the frame 204 has the same image with the previous frame 202. Thus, the frame processing module 154 does not generate any corresponding frame data for the frame 204 because there is no difference between the frame 204 and the previous frame 202.

When the frame processing module 154 receives the frame 206, which is a blank frame, the frame processing module 154 does not generate any corresponding frame data for the blank frame.

When the frame processing module 154 receives the frame 208, which is a non-blank frame, the frame processing module 154 determines the frame 208 as a non-reference frame because a reference frame 202 exists. The frame processing module 154 then compares the frame 208 with the previous non-blank frame (the reference frame 202), and determines that the frame 208 changes from the reference frame 202. Thus, the frame processing module 154 generates a delta frame 218 as the frame data of the frame 208. The delta frame 218 includes a patch of the frame 208 different from the reference frame 202 and the coordinates of the patch. The frame processing module 154 also generates the time information (time value T=4) corresponding to the frame 208 as the timestamp 228. Thus, the delta frame data 218 and the timestamp 228 constitute the data corresponding to the reference frame 208.

Figure 3:
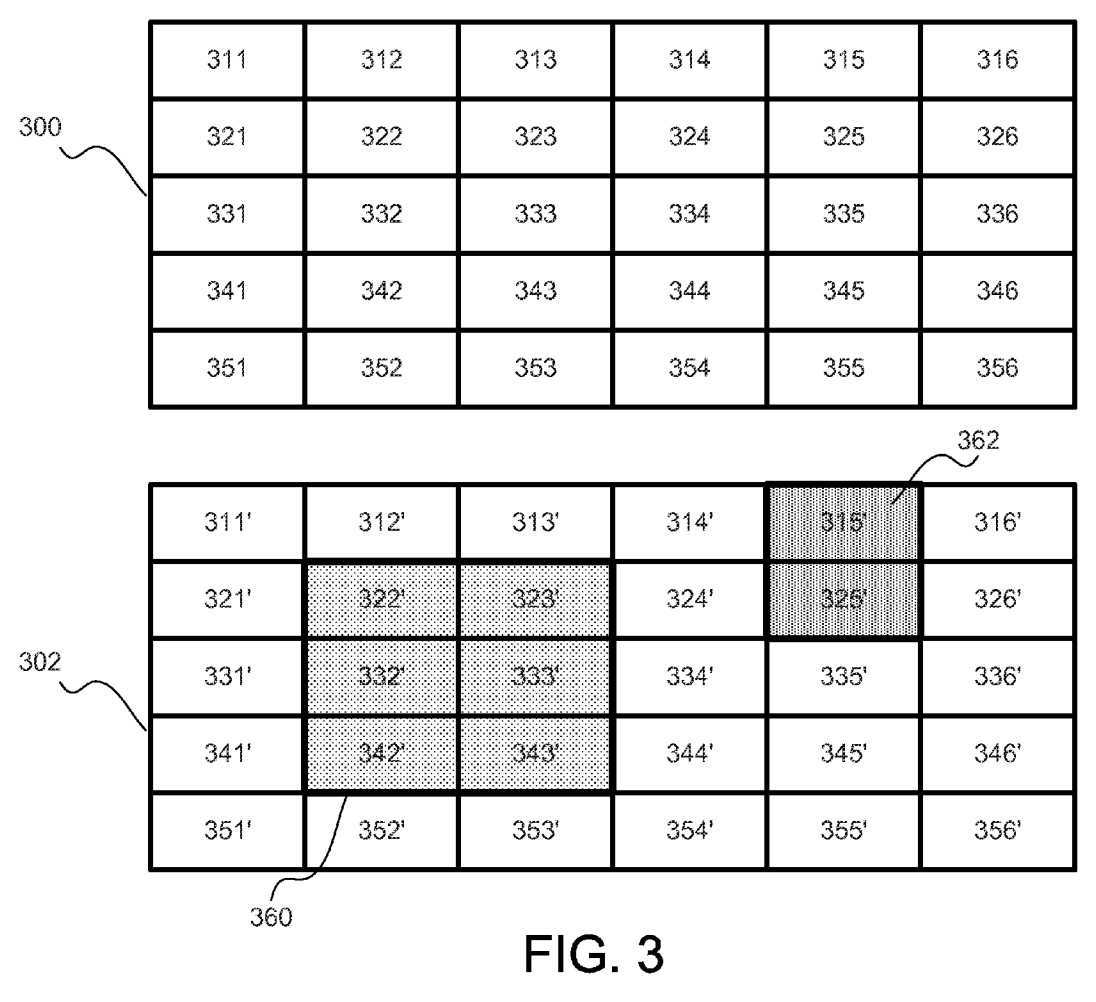

In certain embodiments, the delta frame 218 may include multiple unconnected patches. FIG. 3 schematically depicts comparison of frames to generate patches according to certain embodiments of the present disclosure. As shown in FIG. 3, to process a frame 302, which has a previous non-blank frame 300, the frames 300 and 302 are can be divided into a plurality of tiles in a matrix form. Each tile refers to at least one image display unit of the screen. The size of the tile is configurable. In certain embodiments, a tile size can be 16*16 pixels. To compare the frame 302 to the previous frame 300, the image data is compared on a tile-to-tile basis. In other words, each tile of the current frame 302 is compared to the corresponding tile of the previous frame 300 to determine whether at least one tile of the current frame 302 has changed from the corresponding tile of the previous frame 300. In certain embodiments, if any pixel in a tile has changed from the previous frame 300 to the current frame 302, the frame processing module 154 may determine that the tile has changed. After determine the changed tiles in the frame 302, the frame processing module 154 then generates a plurality of patches by converting the adjacent changed tiles to a patch. For example, as shown in FIG. 3, the tiles 315, 325, 322, 323, 332, 333, 342 and 343 has changed from the frame 300 to the frame 302. Thus, the frame processing module 154 converts the adjacent tiles 322', 323', 332', 333', 342' and 343' of the current frame 302 to a patch 360, and converts the adjacent tiles 315' and 325' of the current frame 302 to a patch 362. Each patch includes at least one tile. Thus, the delta frame of the frame 302 includes the two patches 360 and 362, and does not include the other unchanged tiles from the previous frame 300.

The configuration file 156 is a file storing information for the live KVM capture. In certain embodiments, the configuration file 156 stores information of a predetermined block size of a video block, information of size of the available memory space of the memory 122, and a node structure. For example, when the available memory space of the memory 122 is 128 MB, the predetermined block size of a video block can be 8 MB.

Figure 4:
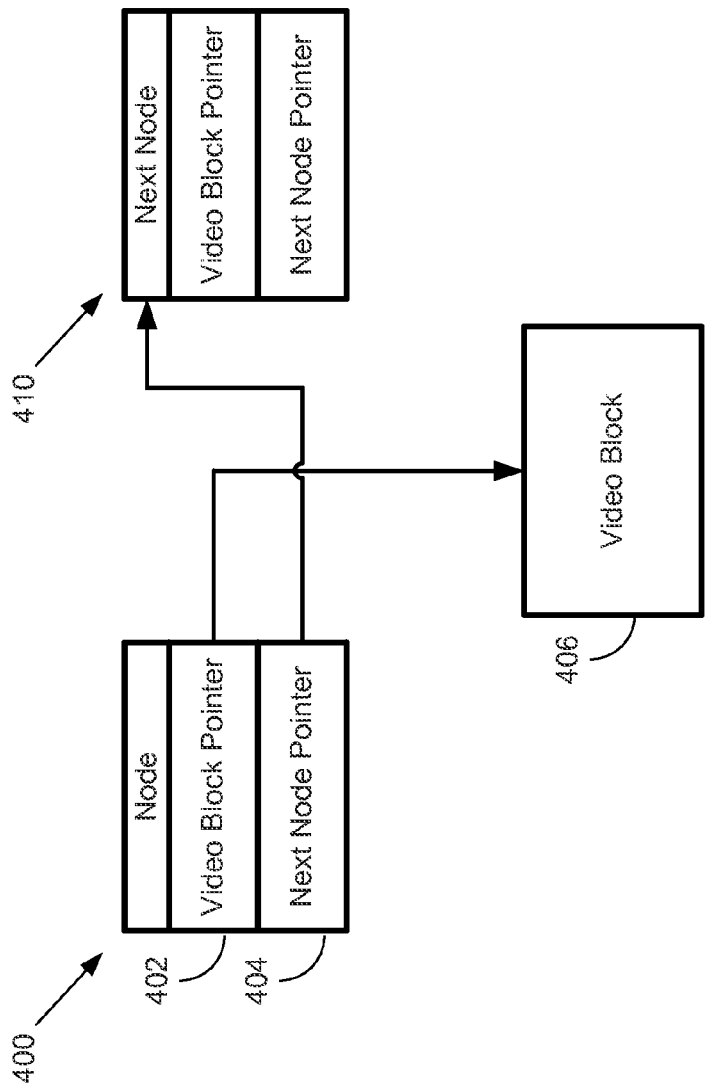
FIG. 4 schematically depicts a node structure according to certain embodiments of the present disclosure.

FIG. 4 schematically depicts a node structure according to certain embodiments of the present disclosure. The node structure 400 is a pointer structure, which includes two pointers: a video block pointer 402 and a next node pointer 404. The video block pointer 402 is configured to store the memory address of a video block 406 corresponding to the node structure 400. The video block 406 is used for storing the frame data and the timestamp of the frames generated by the frame processing module 154. The next node pointer 404 is configured to store the memory address of a next node 410. The next node 410 also has the similar pointer structure as the node structure 400.

Figure 5A:
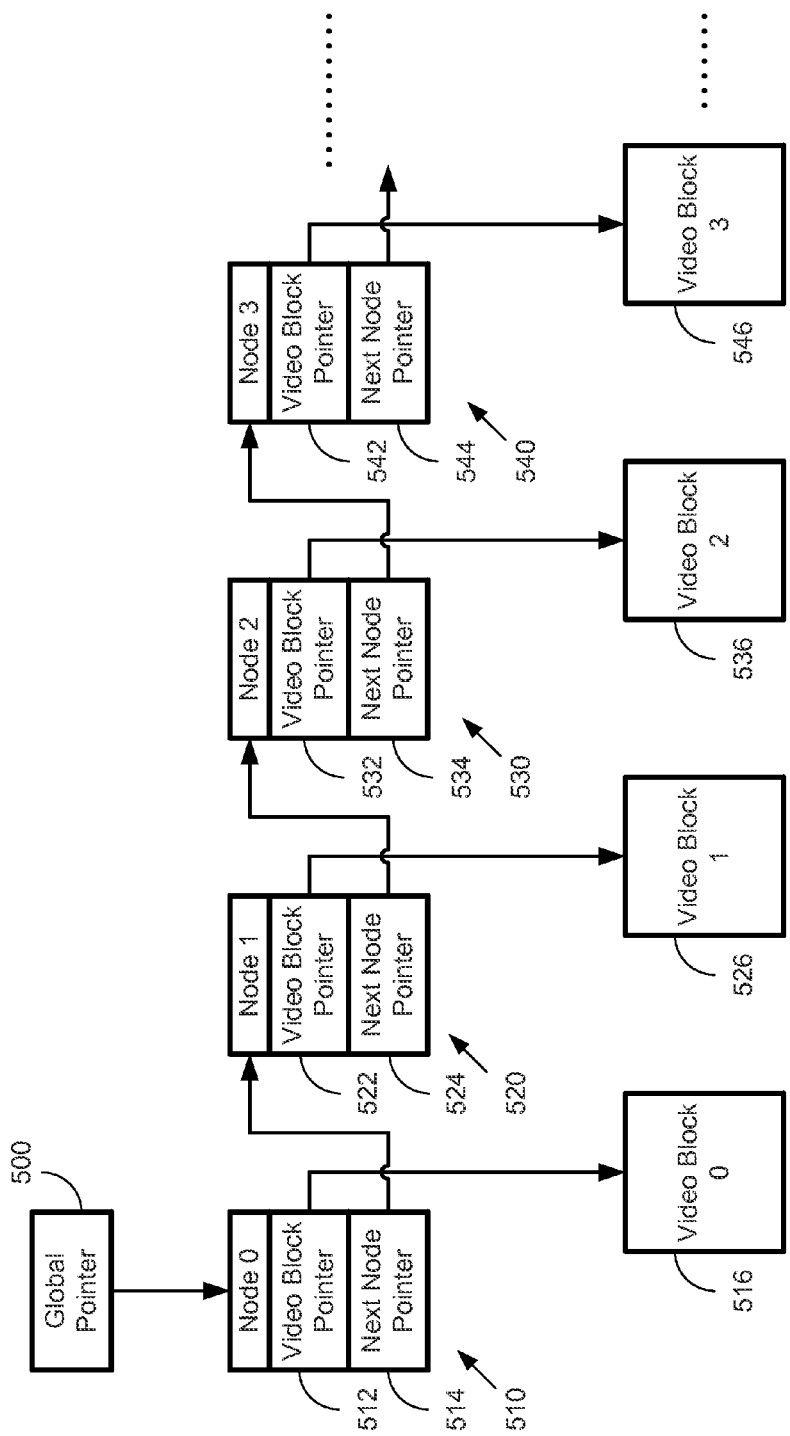
FIG. 5A schematically depicts memory allocation of the BMC in the live KVM capture according to certain embodiments of the present disclosure.

FIG. 5A schematically depicts memory allocation of the BMC in the live KVM capture according to certain embodiments of the present disclosure. As shown in FIG. 5A, at the start of the live KVM capture, the BMC 120 reads the configuration file 156 to obtain the information of the predetermined block size, the information of size of the available memory space of the memory 122, and the node structure. Then, the BMC 120 allocates a global pointer 500 in the available memory space of the memory 122. The global pointer 500 is configured to store the memory address of a start node.

Then, the BMC 120 allocates a first node (Node 0) 510 having the node structure, and a first video block 516 having the predetermined block size in the available memory space of the memory 122. Once the first node 510 and the first video block 516 are allocated, the BMC 120 assigns a start value to the global pointer 500 to indicate the memory address of the first node 510, and assigns a first value to the video block pointer 512 of the first node 510 to indicate the memory address of the first video block 516. The next node pointer 514 of the first node 510 remains null at this time because there is no next node to the first node 510. Thus, the first node 510 is configured as the start node and a current node, and the first video block 516 is configured as a start video block and a current video block. The BMC 120 can then capture video signals of the host computer 110, and send the frames of the video signals to the frame processing module 154 to generate the frame data and timestamp for each frame. Once the frame processing module 154 generates the frame data and timestamp for a frame, the BMC stores the frame data and timestamp in the first video block 516.

When the first video block 516 becomes full, the BMC 120 allocates a second node (Node 1) 520 having the node structure, and a second video block 526 having the predetermined block size in the available memory space of the memory 122. Once the second node 520 and the second video block 526 are allocated, the BMC 120 assigns a node value to the next node pointer 514 of the first video block 510 to indicate the memory address of the second node 520, and assigns a second value to the video block pointer 522 of the second node 520 to indicate the memory address of the second video block 526. The next node pointer 524 of the second node 520 remains null at this time because there is no next node to the second node 520. Since the first video block 516 is now full, the second node 520 becomes a new current node, and the second video block 526 becomes a new current video block. The BMC 120 can then store the frame data and timestamp in the second video block 526.

Similarly, when the second video block 526 (the current video block) becomes full, the BMC 120 allocates a next node (third node, Node 2) 530 having the node structure, and a next video block (third video block) 536 having the predetermined block size in the available memory space of the memory 122. Once the third node 530 and the third video block 536 are allocated, the BMC 120 assigns a node value to the next node pointer 524 of the second video block (current video block) 520 to indicate the memory address of the third node (next node) 520, and assigns a third value to the video block pointer 532 of the third node 530 to indicate the memory address of the third video block 536. The next node pointer 534 of the third node 530 remains null at this time because there is no next node to the third node 530. Since the second video block 526 is now full, the third node (next node) 530 becomes a new current node, and the third video block (next video block) 536 becomes a new current video block. The BMC 120 can then store the frame data and timestamp in the third video block 536.

As discussed above, when the current video block becomes full, the BMC 120 may allocate a new node and a new video block in the available memory space of the memory 122 to store the frame data and timestamp of the frames. The process continues until all available memory space of the memory 122 becomes full with the video blocks.

When all available memory space of the memory 122 becomes full with the video blocks, the BMC 120 has to release some memory space occupied by the nodes and the video blocks.

Figure 5B:
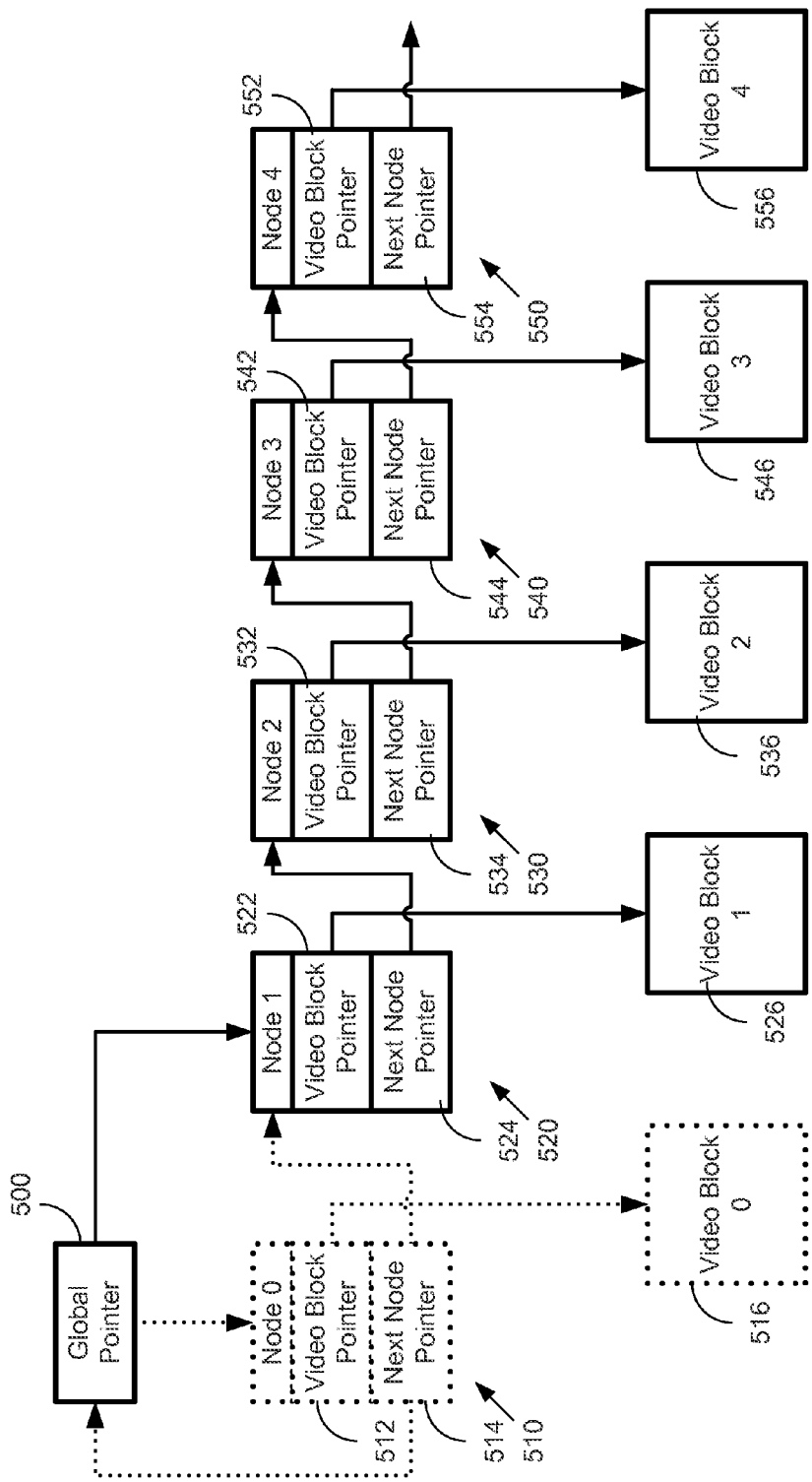
FIG. 5B schematically depicts memory allocation of the BMC in the live KVM capture when the memory is full according to certain embodiments of the present disclosure.

FIG. 5B schematically depicts memory allocation of the BMC in the live KVM capture when the memory is full according to certain embodiments of the present disclosure. As shown in FIG. 5B, when all available memory space of the memory 122 becomes full with the video blocks 516-546, the BMC 120 replaces the start value of the global pointer 500 by the value stored in the next node pointer of the start node. Since the first node 510 is the start node, the start value of the global pointer 500 is replaced by the value stored in the next node pointer 514. In other words, the global pointer 500 now indicates the memory address of the second node (Node 1) 520. The second node 520 now becomes the new start node, and the second video block 526 becomes the new start video block.

In certain embodiments, the replacement of the start value of the global pointer 500 can be achieved by assigning the value stored in the next node pointer 514 of the start node (the first node 510) to a temporary pointer, and the replacing the start value of the global pointer 500 by the value of the temporary pointer. Thus, once the temporary pointer is assigned, the available memory space occupied by the start node (the first node 510) and the start video block (the first video block 516) can be freed. The BMC 120 can then allocate the freed available memory space for a new node and a new video block.

Figure 6A:
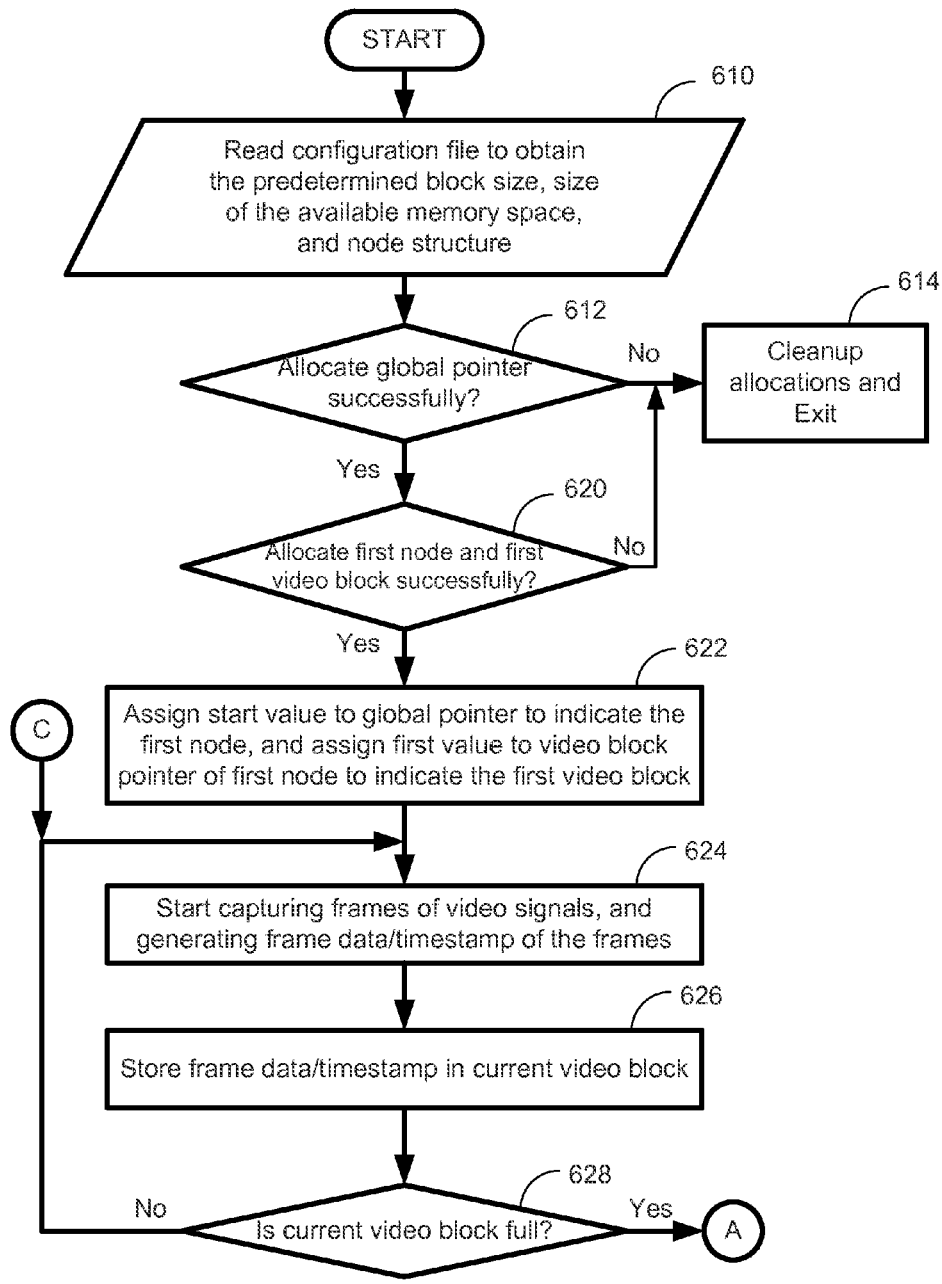
FIGS. 6A to 6C depict a flowchart of system event assisted live KVM capture according to certain embodiments of the present disclosure.
Figure 6B:
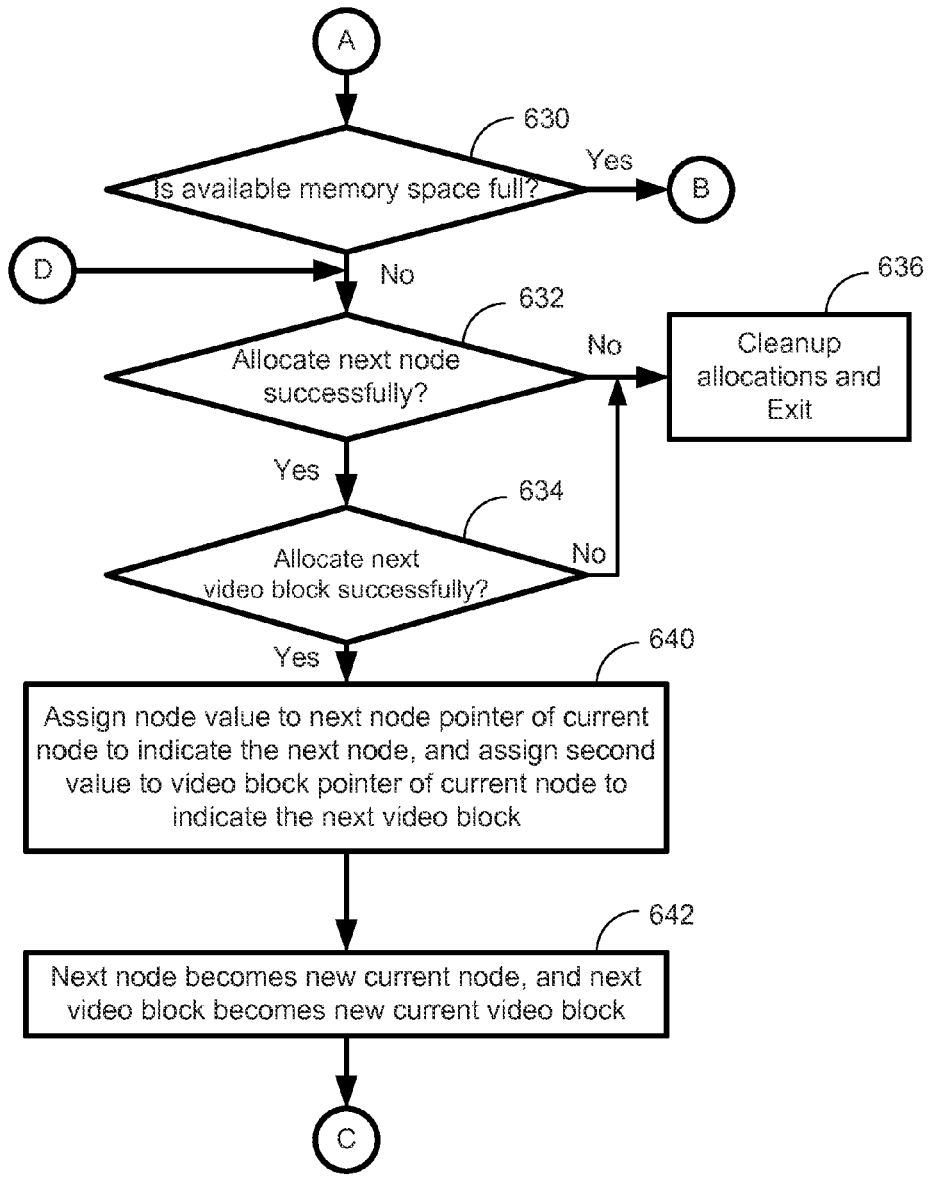
Figure 6C:
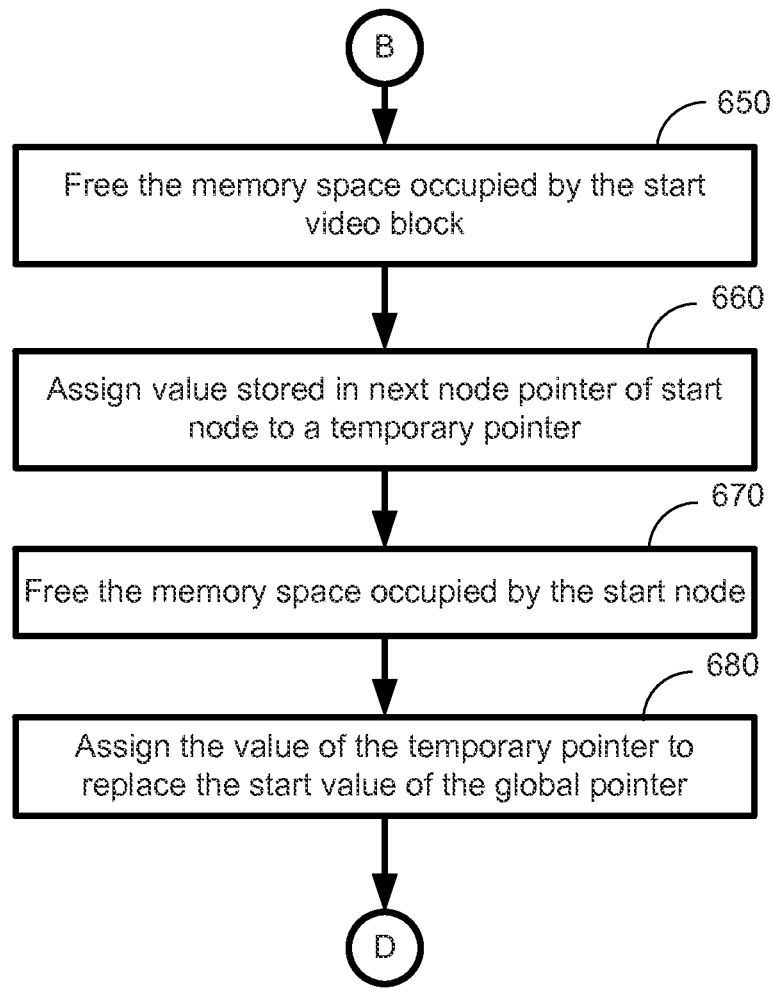

FIGS. 6A to 6C depict a flowchart of system event assisted live KVM capture according to certain embodiments of the present disclosure. As shown in the flowchart, when the live KVM capture process starts, at procedure 610, the BMC 120 reads the configuration file 156 to obtain the information of the predetermined block size, the information of size of the available memory space of the memory 122, and the node structure. Then, at procedure 612, the BMC 120 allocates a global pointer 500 in the available memory space of the memory 122. If allocation of the global pointer 500 fails, the BMC 120 enters procedure 614 to clean up the allocations and exit the process.

After allocating the global pointer 500, at procedure 620, the BMC 120 allocates a first node (Node 0) 510 having the node structure, and a first video block 516 having the predetermined block size in the available memory space of the memory 122. Similarly, if allocation of the first node 510 and/or the first video block 516 fails, the BMC 120 enters procedure 614 to clean up the allocations and exit the process.

Once the first node 510 and the first video block 516 are allocated, the BMC 120 enter procedure 622 to assign a start value to the global pointer 500 to indicate the memory address of the first node 510, and assigns a first value to the video block pointer 512 of the first node 510 to indicate the memory address of the first video block 516. The next node pointer 514 of the first node 510 remains null at this time because there is no next node to the first node 510. Thus, the first node 510 is the current node, and the first video block 516 is the current video block.

Then, at procedure 624, the BMC 120 starts capturing frames of video signals of the host computer 110, and sending the frames of the video signals to the frame processing module 154 to generate the frame data and timestamp for the frames. Once the frame processing module 154 generates the frame data and timestamp for a frame, at procedure 626, the BMC stores the frame data and timestamp in the current video block (at this time, the first video block 516).

Then, at procedure 628, the BMC 120 checks if the current video block (at this time, the first video block 516) is full. When the first video block 516 becomes full, the BMC 120 stops capturing the frames, and enters procedure 630 to check if the available memory space of the memory 122 is full. Since there is only one video block in the memory 122, the available memory space of the memory 122 is not full. The BMC 120 then enters operations 632 and 634 to allocate a next node (the second node 520, Node 0) having the node structure, and a next video block (the second video block 526) having the predetermined block size in the available memory space of the memory 122. Similarly, if allocation of the next node and/or the next video block fails, the BMC 120 enters procedure 636 to clean up the allocations and exit the process.

Once the next node and the next video block are allocated, the BMC 120 enter procedure 640 to assigns a node value to the next node pointer 514 of the current video block (the first video block 510) to indicate the memory address of the next node (the second node 520), and assigns a second value to the video block pointer 522 of the next node (the second node 520) to indicate the memory address of the second video block 526. The next node pointer 524 of the second node 520 remains null at this time because there is no next node to the second node 520. Once the pointers are assigned, at procedure 642, the next node (the second node 520) becomes the new current node, and the next video block (the second video block 526) becomes the new current video block. Then, the BMC 120 goes back to procedure 624 to starts capturing frames of video signals of the host computer 110, generating the frame data and timestamp for the frames, and storing the frame data and timestamp in the new current video block. The BMC repeats the procedures 624-642 until the available memory space of the memory 122 is full.

When all available memory space of the memory 122 becomes full with the video blocks, at procedure 650, the BMC 120 frees the memory space occupied by the start video block (the first video block 516). Then, at procedure 660, the BMC 120 assigns the value stored in the next node pointer 514 of the start node (the first node 510) to a temporary pointer. Then, at procedure 670, the BMC 120 frees the memory space occupied by the start node (the first node 510). Once the memory space occupied by the start node and the start video block is freed, at procedure 680, the BMC 120 assigns the value of the temporary pointer to replace the start value of the global pointer 500. Thus, the start value of the global pointer 500 is replaced by the value stored in the next node pointer 514. In other words, the global pointer 500 now indicates the memory address of the second node (Node 1) 520. The second node 520 now becomes the new start node, and the second video block 526 becomes the new start video block. The BMC 120 then goes back to procedure 632 to allocate the next node and the next video block with the freed memory space.

It should be noted that, once the BMC 120 starts capturing the frames of the video signals and stores the frame data/timestamp in the video blocks, a user may remotely monitor, from the computing device 140, the host computer 110 for any system event that may trigger the KVM redirection. If no system event occurs for triggering, the live KVM capture process continues. If a system event at the host computer 110 triggers the KVM redirection, the user may then issue the instruction from the computing device 140 to the BMC 120 for redirecting KVM signals of the host computer 110 from the BMC 120 to the computing device 140 for monitoring the frame data on the computing device 140. Since the frame data of each frame has a corresponding timestamp, the user may freely rewind the screenshots and analyze the appropriate screen frames if intended.

It should be appreciated that the method of live KVM capture as described in the embodiments of the present disclosure lies on the intrinsic KVM feature that is available in the market. In other words, any system with KVM features is capable of using the method as described in the present disclosure.

Further, the method as described in the embodiments of the present disclosure stores the nodes and the video blocks in the memory 122 of BMC 120. However, alternate storage media or devices such as SD cards, remote storage, local flash drives, etc. can be used to replace the memory 122 of the BMC 120 for storing the nodes and the video blocks.

Further, the method of live KVM capture as described in the embodiments does not depend on any particular OS on the host computer 110. A user may use the method to monitor the host computer 110 with any host OS, such as Windows, Linux, MAC OS X, and other operating systems, with the capability of triggering the BMC on a system event.

Further, the method of live KVM capture as described in the embodiments is optimized to record the video signals of the host computer 110 in a limited memory environment of the BMC 120. Thus, the method is not dependent on any additional high-end hardware to achieve the KVM monitoring task.

The method as described in the embodiments of the present disclosure can be used in the field of, but not limited to, remote troubleshooting, fault analysis, surveillance and maintenance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method of performing video capture at a host computer, comprising:
    obtaining, by a baseboard management controller (BMC) of the host computer, information of a predetermined block size, wherein the BMC comprises a memory having available memory space;
    allocating, at the BMC, in the available memory space of the memory a first video block having the predetermined block size and a first node having a node structure, wherein the node structure comprises a video block pointer and a next node pointer;
    assigning a start value to a global pointer and a first value to the video block pointer of the first node, wherein the start value indicates a memory address of the first node, and the first value indicates a memory address of the first video block, wherein the first node is a start node and the first video block is a start video block;
    capturing, at the BMC, video frames of the host computer, and processing each frame of the video frames to generate frame data and a timestamp corresponding to the each frame;
    storing the frame data and the timestamp in the first video block;
    in response to the first video block being full, allocating, at the BMC, in the available memory space of the memory a second video block having the predetermined block size and a second node having the node structure;
    assigning a node value to the next node pointer of the first block and a second value to the video block pointer of the second node, wherein the node value indicates a memory address of the second node, and the second value indicates a memory address of the second video block; and
    storing the frame data and the timestamp in the second video block.

2. The method as claimed in claim 1, further comprising:
    in response to a current video block being full, allocating, at the BMC, in the available memory space of the memory a next video block having the predetermined block size and a next node having the node structure;
    assigning a next node value to the next node pointer of the current video block and a third value to the video block pointer of the next node, wherein the next node value indicates a memory address of the next node, and the third value indicates a memory address of the next video block; and storing the frame data and the timestamp in the next video block.

3. The method as claimed in claim 1, further comprising:
in response to the memory being full, replacing the start value of the global pointer by a value stored in the next node pointer of the start node, and freeing the available memory space occupied by the start node and the start video block.

4. The method as claimed in claim 3, wherein the replacing of the start value of the global pointer comprises:
assigning the value stored in the next node pointer of the start node to a temporary pointer;
freeing the available memory space occupied by the start node and the start video block; and
replacing the start value of the global pointer by the value of the temporary pointer, such that the node indicated by the replaced start value of the global pointer is configured as a new start node, and the video block indicated by the video block pointer of the new start node is configured as a new start video block.

5. The method as claimed in claim 1, further comprising:
in response to a system event occurring in the host computer, redirecting, at a KVM redirection module of the BMC, the frame data and the timestamp stored in the video blocks of the memory to a computing device such that the computing device displays the frame data according to the timestamp on a display device of the computing device.

6. The method as claimed in claim 1, wherein the capturing step comprises:
capturing, by the BMC, a current frame of the video frames;
when the current frame is a reference frame, generating a full screen frame data of the reference frame as the frame data, and generating time information corresponding to the reference frame as the timestamp; and
when the current frame is a non-reference frame, comparing the current frame with a previous frame, and if the current frame changes from the previous frame, generating a delta frame as the frame data of the current frame, and generating time information corresponding to the current frame as the timestamp, wherein the delta frame comprises at least one patch of the current frame different from the previous frame.

7. The method as claimed in claim 6, further comprising:
skipping the current frame when the current frame is a blank frame.

8. The method as claimed in claim 6, wherein the comparing of the current frame and the previous frame comprises:
dividing the current frame and the previous frame into a plurality of tiles in a matrix form;
comparing each tile of the current frame to the corresponding tile of the previous frame; and
if at least one tile of the current frame changes from the previous frame, generating the at least one patch of the delta frame from the at least one changed tile.

9. The method as claimed in claim 1, further comprising:
retrieving, at the BMC, a configuration file from a non-volatile memory, wherein the configuration file stores the information of the predetermined block size and the node structure.

10. The method as claimed in claim 9, wherein the configuration file further stores information of size of the available memory space of the memory of the BMC.

11. A system for video capture, comprising:
a host computer; and
a baseboard management controller (BMC) connected to the host computer, the BMC comprising a memory having available memory space and a non-volatile memory storing a firmware, wherein the firmware is configured, when executed, to:
obtain information of a predetermined block size;
allocate, in the available memory space of the memory a first video block having the predetermined block size and a first node having a node structure, wherein the node structure comprises a video block pointer and a next node pointer;
assign a start value to a global pointer and a first value to the video block pointer of the first node, wherein the start value indicates a memory address of the first node, and the first value indicates a memory address of the first video block, wherein the first node is a start node and the first video block is a start video block;
capture video frames of the host computer, and process each frame of the video frames to generate frame data and a timestamp corresponding to the each frame;
store the frame data and the timestamp in the first video block;
in response to the first video block being full, allocate in the available memory space of the memory a second video block having the predetermined block size and a second node having the node structure;
assign a node value to the next node pointer of the first block and a second value to the video block pointer of the second node, wherein the node value indicates a memory address of the second node, and the second value indicates a memory address of the second video block; and
store the frame data and the timestamp in the second video block.

12. The system as claimed in claim 11, wherein the firmware is further configured, when executed, to:
in response to a current video block being full, allocate, at the BMC, in the available memory space of the memory a next video block having the predetermined block size and a next node having the node structure;
assign a next node value to the next node pointer of the current video block and a third value to the video block pointer of the next node, wherein the next node value indicates a memory address of the next node, and the third value indicates a memory address of the next video block; and
store the frame data and the timestamp in the next video block.

13. The system as claimed in claim 11, wherein the firmware is further configured, when executed, to:
in response to the memory being full, replace the start value of the global pointer by a value stored in the next node pointer of the start node, and free the available memory space occupied by the start node and the start video block.

14. The system as claimed in claim 13, wherein the firmware is configured to replace the start value of the global pointer by:
assigning the value stored in the next node pointer of the start node to a temporary pointer;
freeing the available memory space occupied by the start node and the start video block; and replacing the start value of the global pointer by the value of the temporary pointer, such that the node indicated by the replaced start value of the global pointer is configured as a new start node, and the video block indicated by the video block pointer of the new start node is configured as a new start video block.

15. The system as claimed in claim 11, wherein the firmware is further configured, when executed, to:
in response to a system event occurring in the host computer, redirect, at a KVM redirection module of the BMC, the frame data and the timestamp stored in the video blocks of the memory to a computing device such that the computing device displays the frame data according to the timestamp on a display device of the computing device.

16. The system as claimed in claim 11, wherein the firmware is configured to capture the video frames of the host computer and to process each frame of the video frames by:
capturing a current frame of the video frames;
when the current frame is a reference frame, generating a full screen frame data of the reference frame as the frame data, and generating time information corresponding to the reference frame as the timestamp;
when the current frame is a non-reference frame, comparing the current frame with a previous frame, and if the current frame changes from the previous frame, generating a delta frame as the frame data of the current frame, and generating time information corresponding to the current frame as the timestamp, wherein the delta frame comprises at least one patch of the current frame different from the previous frame; and
skipping the current frame when the current frame is a blank frame.

17. The system as claimed in claim 16, wherein the firmware is configured to compare the current frame and the previous frame by:
dividing the current frame and the previous frame into a plurality of tiles in a matrix form;
comparing each tile of the current frame to the corresponding tile of the previous frame; and
if at least one tile of the current frame changes from the previous frame, generating the at least one patch of the delta frame from the at least one changed tile.

18. The system as claimed in claim 11, wherein the firmware is further configured, when executed, to retrieve a configuration file from a non-volatile memory, wherein the configuration file stores the information of the predetermined block size, the node structure, and information of size of the available memory space of the memory of the BMC.

19. A baseboard management controller (BMC) for video capture of a host computer, comprising:
a memory having available memory space; and
a non-volatile memory storing a firmware, wherein the firmware is configured, when executed, to:
obtain information of a predetermined block size;
allocate, in the available memory space of the memory a first video block having the predetermined block size and a first node having a node structure, wherein the node structure comprises a video block pointer and a next node pointer;
assign a start value to a global pointer and a first value to the video block pointer of the first node, wherein the start value indicates a memory address of the first node, and the first value indicates a memory address of the first video block, wherein the first node is a start node and the first video block is a start video block;
capture video frames of the host computer, and process each frame of the video frames to generate frame data and a timestamp corresponding to the each frame;
store the frame data and the timestamp in the first video block;
in response to the first video block being full, allocate in the available memory space of the memory a second video block having the predetermined block size and a second node having the node structure;
assign a node value to the next node pointer of the first block and a second value to the video block pointer of the second node, wherein the node value indicates a memory address of the second node, and the second value indicates a memory address of the second video block; and
store the frame data and the timestamp in the second video block.

20. The BMC as claimed in claim 19, wherein the firmware is further configured, when executed, to:
in response to a current video block being full, allocate, at the BMC, in the available memory space of the memory a next video block having the predetermined block size and a next node having the node structure;
assign a next node value to the next node pointer of the current video block and a third value to the video block pointer of the next node, wherein the next node value indicates a memory address of the next node, and the third value indicates a memory address of the next video block; and
store the frame data and the timestamp in the next video block.

21. The BMC as claimed in claim 19, wherein the firmware is further configured, when executed, to:
in response to the memory being full, replace the start value of the global pointer by a value stored in the next node pointer of the start node, and free the available memory space occupied by the start node and the start video block.

22. The BMC as claimed in claim 21, wherein the firmware is configured to replace the start value of the global pointer by:
assigning the value stored in the next node pointer of the start node to a temporary pointer;
freeing the available memory space occupied by the start node and the start video block; and
replacing the start value of the global pointer by the value of the temporary pointer, such that the node indicated by the replaced start value of the global pointer is configured as a new start node, and the video block indicated by the video block pointer of the new start node is configured as a new start video block.

23. The BMC as claimed in claim 19, wherein the firmware is further configured, when executed, to:
in response to a system event occurring in the host computer, redirect, at a KVM redirection module of the BMC, the frame data and the timestamp stored in the video blocks of the memory to a computing device such that the computing device displays the frame data according to the timestamp on a display device of the computing device.

24. The BMC as claimed in claim 19, wherein the firmware is configured to capture the video frames of the host computer and to process each frame of the video frames by:
capturing a current frame of the video frames;
when the current frame is a reference frame, generating a full screen frame data of the reference frame as the frame data, and generating time information corresponding to the reference frame as the timestamp;

when the current frame is a non-reference frame, comparing the current frame with a previous frame, and if the current frame changes from the previous frame, generating a delta frame as the frame data of the current frame, and generating time information corresponding to the current frame as the timestamp, wherein the delta frame comprises at least one patch of the current frame different from the previous frame; and skipping the current frame when the current frame is a blank frame.

25. The BMC as claimed in claim 24, wherein the firmware is configured to compare the current frame and the previous frame by:

dividing the current frame and the previous frame into a plurality of tiles in a matrix form;

comparing each tile of the current frame to the corresponding tile of the previous frame; and if at least one tile of the current frame changes from the previous frame, generating the at least one patch of the delta frame from the at least one changed tile.

26. The BMC as claimed in claim 19, wherein the firmware is further configured, when executed, to retrieve a configuration file from a non-volatile memory, wherein the configuration file stores the information of the predetermined block size, the node structure, and information of size of the available memory space of the memory of the BMC.

\* \* \* \* \*